(12) United States Patent
Circello et al.

(10) Patent No.: US 6,766,433 B2
(45) Date of Patent: Jul. 20, 2004

(54) SYSTEM HAVING USER PROGRAMMABLE ADDRESSING MODES AND METHOD THEREFOR

(75) Inventors: Joseph C. Circello, Phoenix, AZ (US); Daniel M. McCarthy, Phoenix, AZ (US); Henri Cloetens, Vilvoorde (BE); Nancy H. Woo, Austin, TX (US); Bridget C. Hooser, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 255 days.

(21) Appl. No.: 09/957,780

(22) Filed: Sep. 21, 2001

(65) Prior Publication Data

US 2003/0061461 A1 Mar. 27, 2003

(51) Int. Cl.[7] .............................................. G06F 12/10
(52) U.S. Cl. ........................ 711/202; 711/220; 714/702
(58) Field of Search ............................. 711/6, 200, 220, 711/202, 170, 171, 172, 173; 345/568; 714/702

(56) References Cited

U.S. PATENT DOCUMENTS 4,489,403 A * 12/1984 Bond ......................... 365/200
4,506,364 A * 3/1985 Aichelmann et al. ........ 714/702
5,133,061 A    7/1992 Melton et al. ............... 395/425
6,081,821 A    6/2000 Hopkinson et al. .......... 708/406
6,219,756 B1 * 4/2001 Kasamizugami ............. 711/127
6,289,430 B1 * 9/2001 Broberg et al. .............. 711/203
6,313,773 B1 * 11/2001 Wilson et al. ............... 341/143
2002/0184467 A1 * 12/2002 Saen et al. ................... 711/202

OTHER PUBLICATIONS

Joe Circello, Motorola, "68K ColdFIRE® Microprocessors", dCF4/dt—The First Derivatives of the Version 4. ColdFire® Integrated Core, Microprocessor Forum Oct. 11, 2000, 22 pgs.

* cited by examiner

Primary Examiner—Matthew Kim
Assistant Examiner—H. B. Patel
(74) Attorney, Agent, or Firm—Robert L. King; Susan C. Hill

(57) ABSTRACT

A system (10) implements user programmable addressing modes in response to control information contained within an input address. Encoded control information stored in a plurality of user programmed address permutation control registers (70–72) is used to determine what bit values are used to replace predetermined bits of the input address to selectively create a corresponding permutated address. Since no modification to a processor's pipeline is required, various permutation addressing modes may be user-defined and implemented using either a general-purpose processor or a specialized processor.

19 Claims, 4 Drawing Sheets

| ADDRESS PERMUTATION CONTROL REGISTER BIT FIELDS (70-72) | DESCRIPTION |
|---|---|
| [3:0] | SPECIAL CONTROL FOR MEMORY ADDRESS[1:0] |
| [7:4] | BIT SPECIFIER FOR MEMORY ADDRESS[1] |
| [11:8] | BIT SPECIFIER FOR MEMORY ADDRESS[2] |
| [15:12] | BIT SPECIFIER FOR MEMORY ADDRESS[3] |
| [19:16] | BIT SPECIFIER FOR MEMORY ADDRESS[4] |
| [23:20] | BIT SPECIFIER FOR MEMORY ADDRESS[5] |
| [27:24] | BIT SPECIFIER FOR MEMORY ADDRESS[6] |
| [31:28] | BIT SPECIFIER FOR MEMORY ADDRESS[7] |
| [35:32] | BIT SPECIFIER FOR MEMORY ADDRESS[8] |
| [39:36] | BIT SPECIFIER FOR MEMORY ADDRESS[9] |
| [43:40] | BIT SPECIFIER FOR MEMORY ADDRESS[10] |
| [47:44] | BIT SPECIFIER FOR MEMORY ADDRESS[11] |
| [51:48] | BIT SPECIFIER FOR MEMORY ADDRESS[12] |
| [55:52] | BIT SPECIFIER FOR MEMORY ADDRESS[13] |
| [59:56] | BIT SPECIFIER FOR MEMORY ADDRESS[14] |
| [63:60] | BIT SPECIFIER FOR MEMORY ADDRESS[15] |

ADDRESS PERMUTATION CONTROL REGISTER 70

*FIG. 3*

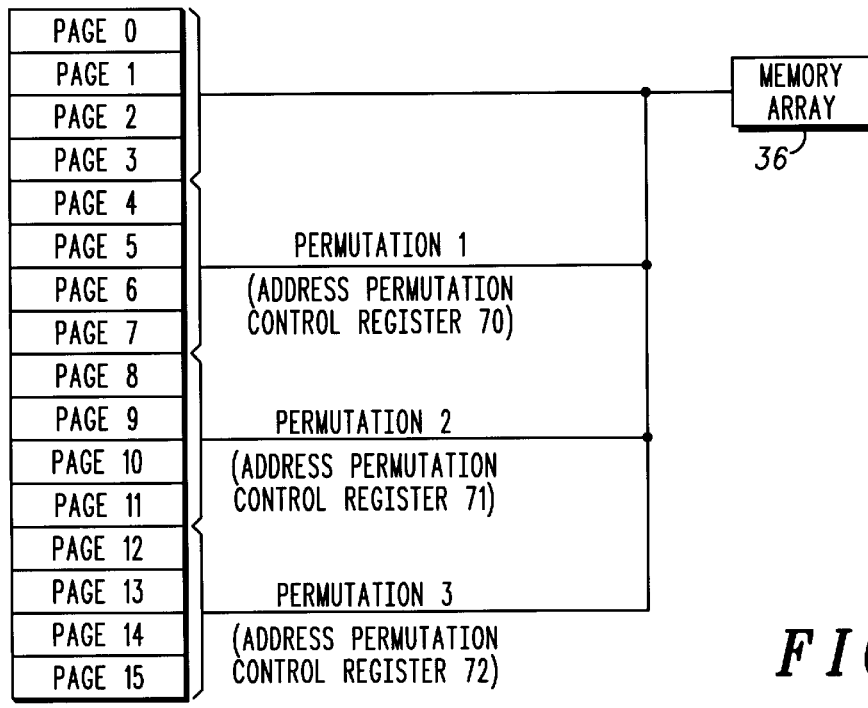

*FIG. 4*

| PHYSICAL MEMORY SIZE | MEMORY BASE ADDRESS | SELECT BITS EXTRACTED FROM NON-PERMUTATED ADDRESS | GUARD BITS FROM NON-PERMUTATED ADDRESS | FUNCTION OF NON-PERMUTATED ADDRESS BITS |
|---|---|---|---|---|
| 2K | 0-MODULO-32K | 14:13 | 12:11 | f(10:0) |
| 4K | 0-MODULO-64K | 15:14 | 13:12 | f(11:0) |
| 8K | 0-MODULO-128K | 16:15 | 14:13 | f(12:0) |
| 16K | 0-MODULO-256K | 17:16 | 15:14 | f(13:0) |
| 32K | 0-MODULO-512K | 18:17 | 16:15 | f(14:0) |
| 64K | 0-MODULO-1024K | 19:18 | 17:16 | f(15:0) |

*FIG. 5*

| PERMUTATION CONTROL REGISTER (PCR) 70-72 PCR[3], PCR[(4i+3):4i] | ADDRESS BIT (i) OF THE PERMUTATED ADDRESS 38 FOR BITS [15:2] |
|---|---|
| X0000 | 0 |
| 00001 | 1 |
| 10001 | NON-PERMUTATED ADDRESS [1] |
| X0010 | NON-PERMUTATED ADDRESS [2] |
| X0011 | NON-PERMUTATED ADDRESS [3] |
| X0100 | NON-PERMUTATED ADDRESS [4] |
| X0101 | NON-PERMUTATED ADDRESS [5] |
| X0110 | NON-PERMUTATED ADDRESS [6] |
| X0111 | NON-PERMUTATED ADDRESS [7] |
| X1000 | NON-PERMUTATED ADDRESS [8] |
| X1001 | NON-PERMUTATED ADDRESS [9] |
| X1010 | NON-PERMUTATED ADDRESS [10] |
| X1011 | NON-PERMUTATED ADDRESS [11] |
| X1100 | NON-PERMUTATED ADDRESS [12] |
| X1101 | NON-PERMUTATED ADDRESS [13] |
| X1110 | NON-PERMUTATED ADDRESS [14] |
| X1111 | NON-PERMUTATED ADDRESS [15] |

*FIG. 6*

| ADDRESS PERMUTATION CONTROL REGISTER 70-72 [3:0] | PERMUTATED ADDRESS [1] | PERMUTATED ADDRESS [0] |
|---|---|---|
| 0000 | 0 | 0 |
| 0001 | 0 | 1 |
| 0010 | 1 | 0 |
| 0011 | 1 | 1 |
| 0100 | NON-PERMUTATED ADDRESS[1] | 0 |
| 0101 | NON-PERMUTATED ADDRESS[1] | 1 |
| 0110 | NON-PERMUTATED ADDRESS[1] | NON-PERMUTATED ADDRESS[0] |
| 1000 | BIT SPECIFIER 1 | 0 |
| 1001 | BIT SPECIFIER 1 | 1 |
| 1010 | BIT SPECIFIER 1 | NON-PERMUTATED ADDRESS[0] |

SYSTEM HAVING USER PROGRAMMABLE ADDRESSING MODES AND METHOD THEREFOR

FIELD OF THE INVENTION

The present invention relates to information processing and, more particularly, to optimization of memory addressing in systems.

BACKGROUND OF THE INVENTION

Signal processors typically support addressing modes tailored for common signal processing algorithms. For example, digital signal processors commonly include features to optimize the performance of the Fast Fourier Transform (FFT). The Fast Fourier Transform typically uses multiple addressing modes including carry-reverse or bit reverse addressing. Other signal processing algorithms make extensive use of modulo addressing for easy array-based data and coefficient access. These addressing modes are often different than those modes supported in a more general-purpose processor. Often, the addressing modes for a general-purpose processor are based on efficient support for high-level languages like C, C++ and FORTRAN and not necessarily optimized for the operand reference patterns found in signal processing algorithms. In many cases, the entire organization of the processor's pipeline is structured around the requirements of these basic addressing modes. As a result, many general-purpose processors do not support these advanced addressing modes. Typically, processor architectures are designed specifically to implement DSP-specific functions or general-purpose functions, but not both. Although general-purpose processors implement more than one general type of addressing mode, the addressing modes of such processors are not optimized for use with specialized applications such as digital signal processing, including certain audio processing functions.

As processing functions merge, more specialized functions need to be implemented by general-purpose processors, but most general-purpose processors are not capable of supporting advanced memory addressing modes. Implementing advanced memory addressing modes inside a general-purpose processor typically requires a restructuring of the pipeline architecture before such advanced addressing modes may be implemented.

BRIEF DESCRIPTION OF THE DRAWINGS

FIG. 3 illustrates in tabular form bit field assignments within one of the permutation control registers of FIG. 2;

FIG. 4 illustrates in block diagram form memory partition mapping of a memory array of FIG. 1;

FIG. 5 illustrates in tabular form bit field assignments of addresses in non-permutated form for varying memory sizes;

FIG. 6 illustrates in tabular form bit field encoding of a portion of bits contained in the permutated address in accordance with the present invention; and FIG. 7 illustrates in tabular form bit field encoding of another portion of bits contained in the permutated address in accordance with the present invention.

DETAILED DESCRIPTION OF THE DRAWINGS

Figure 1:
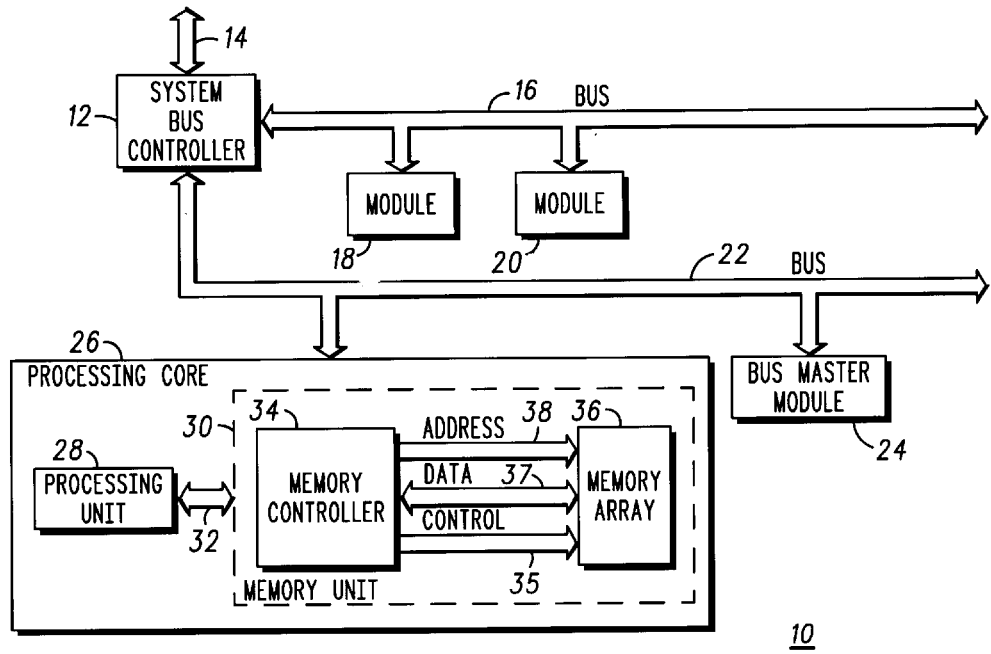
FIG. 1 illustrates in block diagram form an exemplary system for use with the present invention.

FIG. 1 illustrates a system 10 with user programmable addressing modes in which addresses are selectively modified or permutated. System 10 has a system bus controller 12 having a first input/output terminal connected to a bus 14. The system bus controller 12 has a second input/output terminal connected to a slave bus 16. Connected to bus 16 are multiple slave devices illustrated generally as a module 18 and a module 20. Modules 18 and 20 may be any number of devices such as a timer, a Universal Asynchronous Receive/Transmit (UART), parallel ports, memories, serial communication devices, data converters, etc. A third input/output terminal of system bus controller 12 is connected to an internal bus 22. Connected to internal bus 22 is a processing core 26 and a bus master module 24. Bus master module 24 can initiate bus transfers in a manner similar to the processing core 26. Each of bus master module 24 and processing core 26 is a bi-directional device and each receives and provides information to internal bus 22. Bus master module 24 may be any number of devices such as a direct memory access (DMA) device, another processing core, etc. Within system bus controller 12 is logic circuitry that functions to arbitrate bus traffic between the processing core 26, the bus master module 24 and any other device (not shown) connected to internal bus 22. Only a portion of processing core 26 is illustrated. The processing core 26 has a processing unit 28 connected via a bus 32 to a memory unit 30. Memory unit 30 has a memory controller 34 connected via a control bus 35, a data bus 37 and an address bus 38 to a memory array 36.

In operation, system 10 may be implemented to permit a user to define and select one of multiple memory addressing modes for addressing memory 36. Support for both general-purpose algorithms and specialized data processing addressing may be implemented without requiring specific pipeline support from the processing unit 28. Memory controller 34 functions as an interface between memory array 36 and the processing unit 28. In particular, memory controller 34 handles the generation of control and address information and accessing of data to and from memory array 36. In addition, as will be explained below, memory controller 34 functions to control specific memory addressing modes used to access memory array 36. Such memory addressing modes are user defined via software programming or other control such as integrated circuit pin inputs. When converting between memory addressing modes, an input address is permutated or changed into another predetermined format in order to implement the desired memory addressing mode. It should be noted that the address permutation function is available for use in connection with memory accesses of memory unit 30 from processing unit 28 and memory accesses from bus master module 24 or memory accesses from any other device (not shown) that may be connected to internal bus 22 and referencing the memory unit 30.

Figure 2:
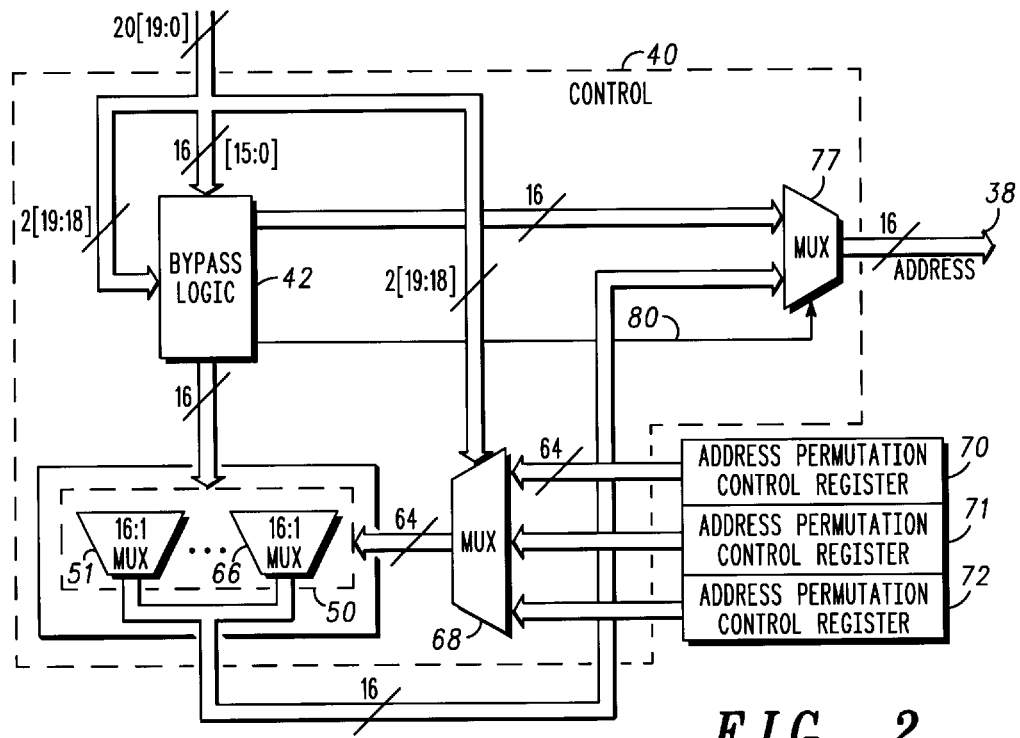
FIG. 2 illustrates in block diagram form memory control circuitry of FIG. 1 for implementing user programmable memory addressing modes.

Illustrated in FIG. 2 is a detail of a portion of memory controller 34. A portion of a twenty-bit address having bits [19:0] (where bit 19 is the most-significant bit and bit 0 is the least-significant bit) is coupled to an input of a bypass logic circuit 42. Bits zero through fifteen of the twenty-bit address are connected to the input of bypass logic circuit 42. A sixteen-bit output of bypass logic circuit 42 is connected to an input of each of sixteen sixteen-to-one multiplexers 50. The sixteen-to-one multiplexers 50 have multiplexers 51–66. Each of multiplexers 51–66 has an output for providing a single bit to form a sixteen-bit address that is connected to a first input of a multiplexer 77. A second output of bypass logic circuit 42 is connected to a second input of multiplexer 77. A third output of bypass logic circuit 42 provides a control signal 80 that is connected to a control input of multiplexer 77 and determines on a cycle-by-cycle basis which address 38 (bypassed or permutated) is sent to the memory array 36. An output of multiplexer 77 provides a sixteen-bit address 38 to memory array 36. A multiplexer 68 provides a control signal to a control input of each of multiplexers 51–66. Two bits, bits eighteen and nineteen, of the twenty-bit input address, serve as the select bits and are connected to a control input of multiplexer 68 to select one of three input signals to select which address permutation control register will be used for address bit manipulation. The same two bits, eighteen and nineteen, of the twenty-bit input address are also connected to a control input of bypass logic circuit 42 to determine if the current input address requires a permutation operation or not. If not, the input address sent to the memory array 36 via address bus 38 will be sent from the bypass logic circuit 42. A first input of multiplexer 68 is connected to an address permutation control register 70 that provides a sixty-four-bit control field. A second input of multiplexer 68 is connected to an address permutation control register 71 that provides a second sixty-four-bit control field. A third input of multiplexer 68 is connected to an address permutation control register 72 that provides a third sixty-four-bit control field. A sixty-four-bit control field output of multiplexer 68 is connected to the control terminals of multiplexers 51–66. In particular, a predetermined four bits of the sixty-four bits is respectively connected to a predetermined one of the multiplexers 51–66. Generally, bypass logic circuit 42, multiplexers 51–66, multiplexer 68 and multiplexer 77 form control circuitry 40.

In operation, a twenty-bit non-permutated input address is received and the low order sixteen bits are used by bypass logic circuit 42. The low order sixteen bits form a modifiable address portion that is selectably modified by control circuitry 40 during address permutation. Bits 16 through 19 form a non-modifiable address portion that is never modified by the control circuitry 40 during address permutation. Bits 16 and 17 are encoded and are used as guard bits and will be discussed below. When guard bits are present, at least one guard bit is used and is located adjacent to and in a more significant bit position than the modifiable address portion [15:0] of the received non-permutated address. Bits 18 and 19 are also encoded and are used to control multiplexer 68. Bypass logic circuit 42 functions as circuitry that uses the encoded bits eighteen and nineteen as control information to determine whether a permutation function is applied to the incoming address. If bits 18 and 19 are nonzero, then a permutation function is applied. Otherwise, the incoming address bypasses the permutation circuitry and is connected by multiplexer 77 as address 38. For example, the control information in bits 18 and 19 provide a permutation bypass option to avoid address permutation when bits 18 and 19 assume a value of "00". When bits 18 and 19 assume a value of "01", the permutation function as defined in address permutation control register 70 is applied to the input address as a control signal to the 16:1 multiplexers 50. When bits 18 and 19 assume a value of "10", the permutation function as defined in address permutation control register 71 is applied to the input address as a control signal to the 16:1 multiplexers 50. When bits 18 and 19 assume a value of "11", the permutation function as defined in address permutation control register 72 is applied to the input address.

Illustrated in FIG. 3 are bit field assignments of the sixty-four bits provided by the address permutation control registers 70–72. The bit field assignments are provided to a user of the system 10 and the user may program or cause to be loaded into registers 70–72 bit values that define the address permutation function to be applied. FIG. 3 illustrates bit field assignments for only permutation control register 70, but it should be understood that the same or other bit field assignments are made for permutation control registers 71 and 72. As illustrated, the permutation of each bit in the address is controlled by a four-bit field within the permutation control register 70. A first bit field, for example, encompasses bits [3:0]. For a given address bit, i, of the sixteen-bit permutated address, the corresponding four-bit specifier is located between bit location 4$i$ through (4$i$+3) of the sixty-four bit permutation control register. For example, the third four-bit field [11:8] controls or directs the permutation of bit two of the non-permutated address to form bit two (i=2) of the permutated address. The same is true for all other four-bit assignments as shown in FIG. 3 with the exception of the first four-bit field. Bits [3:0] control the permutation of both bits 0 and 1 in the non-permutated address to form bits 0 and 1 in the permutated address. The bit fields may be concurrently used by control circuitry 40 to direct permutating of the non-permutated address.

Illustrated in FIG. 4 is a diagram of the memory partition mapping of memory array 36. In the illustrated form, memory array 36 is divided into four groups of memory address ranges. The division creates a multiply-mapped memory space. A first range of pages 0 through 3 illustrates a range of addresses in which no memory address permutation is performed. In other words, when information assigned to that address range is accessed, no memory address permutation occurs. A second address range, designated by pages 4 through 7, is subject to address permutation as controlled by address permutation control register 70. A third address range, designated by pages 8 through 11, is subject to address permutation as controlled by address permutation control register 71. A fourth address range, designated by pages 12 through 15, is subject to address permutation as controlled by address permutation control register 72. Although three different address permutations and a pass-through function have been illustrated, it should be appreciated that any number of memory partitions of any or varying sizes may be implemented.

Illustrated in FIG. 5 are bit field assignments of addresses of the input address in non-permutated form for varying memory sizes of memory array 36. Specific memory array sizes from 2K bytes to 64K bytes are illustrated. Other memory sizes may be chosen. A predetermined required memory base address for each memory size is illustrated in the second column of the FIG. 5 table, where, for this implementation, the sixteen equal-size memory pages illustrated in FIG. 4 require a total address space of sixteen times the physical memory size. For example, for an 8K byte memory, the base address must be 0-modulo 128K which means that the base address must be an even multiple of 128K. The third column of the FIG. 5 table illustrates the two permutation select bits that are used to select which permutation function is applied to the input address. As shown in FIG. 2 where bits eighteen and nineteen are used as the permutation select bits, the size of memory array 36 must be 64K bytes. The fourth column of the FIG. 5 table illustrates which two bits in the input address are used as guard bits. The guard bits serve as a buffer between the upper two bits which contain the permutation select bits and any potential carries or borrows which may result from conventional address generation, such as a post-increment address mode. The fifth column of the FIG. 5 table illustrates the bit width of the input address based upon the physical size of memory array 36. As the physical size of memory array 36 increases, the size of the input address increases. That in turn shifts the bit location of the guard bits and the permutation select bits to more significant bit positions.

Illustrated in FIG. 6 is a bit field encoding for bits two through fifteen of the permutated address. The bit field encoding for bits zero and one will be explained below in connection with FIG. 7. The first column of FIG. 6 illustrates the permutation control register field used to control multiplexers 51–66. The encoding may be considered as bit specifiers because the value of the bit specifiers will determine what ultimate value to use for each bit in the permutated address. The second column of FIG. 6 specifies the actual bit value each of the multiplexers 51–66 is to output based upon the bit specifier.

The following algorithm specifies the bit encoding for bits two through fifteen of the sixteen-bit permutated address, where i designates the bit position in the permutated address:

Extract the bit specifier from the permutation control register for the ith bit of the permutated address.

If the bit specifier is equal to zero, the ith bit of the permutated address is set equal to zero.

If the bit specifier is equal to one AND bit three of the permutation control register is equal to zero, the ith bit of the permutated address is set equal to one.

If the bit specifier is equal to one AND bit three of the permutation control register is equal to one, the ith bit of the permutated address is set equal to bit one of the non-permutated address;

In all other cases, the ith bit of the permutated address assumes the value in the non-permutated address in the bit position as specified in the bit specifier.

It should therefore be noted that bit three of the permutation control register (the added fifth bit illustrated in the far left bit position in the left column of FIG. 6) is only relevant when the bit specifier assumes a value of one. In all other cases, bit three of the permutation control register is not used in the evaluation as designated by an "X", in FIG. 6.

A couple of examples will further illustrate the encodings of FIG. 6. Assume that i equals five and the corresponding bit specifier holds a value of 0111. Since the bit specifier equals 0111, bit five of the permutated address will assume the value contained in bit seven (0111) of the non-permutated address. As a second example, assume that i equals six and the corresponding bit specifier holds a value of 0001 and bit three of the permutation control register holds a value of one. These conditions correspond to the third line of the FIG. 6 table. Therefore, bit six of the permutated address will assume the value of bit one of the non-permutated address.

In system 10, it is possible for processing core 26 and bus master module 24 to access memory with a variety of operand sizes. For example, 8-, 16- and 32-bit accesses are possible with all memory addresses being treated as a byte-level address. Accordingly, special treatment of permutated address bits [1:0] is needed to correctly generate the memory array 36 address based on the size of the operand reference. Illustrated in FIG. 7 is a bit field encoding for bits zero and one of the permutated address. In the left-most column, predetermined values that bits [3:0] may assume are illustrated. Not all possible values are illustrated as some values are not used in the described embodiment. The two right-most columns illustrate corresponding permutated address bits that exist for bit one and bit zero. For example, assuming that permutation control register [3:0] holds a value of 0100, bit one of the permutated address assumes the value in bit one of the non-permutated address and bit zero of the permutated address assumes a value of zero.

As another example, assume that permutation control register [3:0] holds a value of 1010. BitSpecifier 1 corresponds in FIG. 7 to the value in permutation control register [7:4]. Bit 1 of the permutated address will assume the value contained in the bit position as specified by BitSpecifier 1 of the non-permutated address. Bit 0 of the permutated address will assume the value contained in the bit position 0 of the non-permutated address.

Consider the following examples that fully demonstrate the application of the address permutation function to create two common types of user-defined addressing modes.

First, consider the generation of a modulo-$2^k$ table. Permutated addresses for power-of-2 tables are easily created by using the low-order k bits of the input address with the upper bits fixed to a given memory address. Consider a 1024-entry table of 32-bit operands (4096 bytes in total size), based at address 0x1000 (where the 0x prefix identifies a base 16—hexadecimal value). The stream of input addresses begins at zero and simply increments by 4, the number of data bytes per access. The desired mapping between the input address stream and the permutated address output is given by:

TABLE 1

| Input Address Stream | Permutated Address Output |
|---|---|
| 0x0000 | 0x1000 |
| 0x0004 | 0x1004 |
| 0x0008 | 0x1008 |
| ... | ... |
| 0x0ffc | 0x1ffc |
| 0x1000 | 0x1000 |
| 0x1004 | 0x1004 |
| ... | ... |
| 0x1ffc | 0x1ffc |
| 0x2000 | 0x1000 |
| 0x2004 | 0x1004 |
| ... | ... |

As shown in Table 1, the input address increases sequentially, while the permutated address output sequences through a modulo-4096 table beginning at a fixed address. To generate this function, a 64-bit address permutation control register is programmed with the value 0x0001_BA98_7654_32x0, where x signals a don't-care value. The dots in the table illustrate that other intervening address sequences exist but are not fully detailed for purposes of convenience.

Second, consider a bit-reversed table often needed for FFT processing. For a 256 byte, 16-bit data structure based at address 0, the following table defines the required bit reverse function:

TABLE 2

| Input Address Stream | Permutated Address Output |
|---|---|
| 0x0000 | 0x0000 |
| 0x0002 | 0x0080 |
| 0x0004 | 0x0040 |
| 0x0006 | 0x00c0 |
| 0x0008 | 0x0020 |
| 0x000a | 0x00a0 |

TABLE 2-continued

| Input Address Stream | Permutated Address Output |
|---|---|
| 0x000c | 0x0060 |
| 0x000e | 0x00e0 |
| 0x0010 | 0x0010 |
| ... | ... |
| 0x0020 | 0x0008 |
| ... | ... |
| 0x0040 | 0x0004 |
| ... | ... |
| 0x0080 | 0x0002 |

As shown in Table 2, the input address increases sequentially while the permutated address output follows a bit-reversed pattern. To generate this function, a 64-bit address permutation control register is programmed with the value 0x0000_0000_1234_5678. Again, the dots indicate intervening sequences of addresses that are not shown for purposes of convenience.

It should be understood that various timing implementations may be used to implement the address permutations. Also, various buffering techniques may be implemented. As a result, the timing associated with performing address permutations is implementation specific.

By now it should be appreciated that there has been provided a memory address permutation mechanism and method for enabling a user to modify or permutate memory addresses and thereby implement various types of memory permutation modes. The present invention may be used with a general-purpose processor to enable the processor to implement advanced address modes without impacting or changing the processor's pipeline architecture. Memory address permutation modes may be selected or determined by address location (i.e., address mapping). Also, various memory address permutation schemes may be encoded in the address permutation control registers 70–72 to permit great flexibility in switching between address permutations transparently.

Various physical implementations of the present invention may be readily utilized. For example, various architectures can be used for the processing unit 28. The present invention may be implemented on a single integrated circuit chip as a system on a chip or may be implemented using a plurality of discrete processing systems. Numerous physical implementations may be created to implement any of the specific logic blocks illustrated in the figures. For example, the memory array may be implemented as DRAM, SRAM, Flash and having various physical sizes. Bit widths discussed are implementation specific and bit widths other than as discussed, such as for the bit specifier value, may be used. System 10 may be implemented as a system having multiple bus masters. For example, a coprocessor or a DMA may be used with processing unit 28. The present invention may be implemented in MOS, bipolar, SOI, GaAs or other types of semiconductor processing. The circuitry used to implement the memory address permutation may be implemented at various locations within the system 10 and is not limited to implementation within a memory controller. Therefore, it is intended that this invention encompass all such variations and modifications as fall within the scope of the appended claims.

What is claimed is:

1. A system having memory addressing, comprising:
   an address permutation control register having a plurality of bit fields that implement one of a plurality of user controlled addressing modes;
   control circuitry for receiving an input address having a modifiable address portion and for receiving the plurality of bit fields from said address permutation control register, said control circuitry permutating predetermined differing portions of the modifiable address portion of the input address, each of the predetermined differing portions being modified under direction of a respective bit field to generate a permutated address from the modifiable address portion; and
   a memory array for receiving the permutated address from said control circuitry and for using the permutated address to access said memory array.

2. The system as in claim 1 wherein the input address comprises additional bits that function as guard and control bits.

3. The system as in claim 1 wherein the input address further comprises a non-modifiable address portion which is never modified by said control circuitry during permutation.

4. The system as in claim 3 wherein the non-modifiable address portion of the input address comprises at least one guard bit.

5. The system as in claim 3 wherein the non-modifiable address portion of the input address comprises at least one guard bit, wherein the at least one guard bit is not used by said control circuitry.

6. The system as in claim 5 wherein the at least one guard bit is located adjacent to and in a more significant bit position than the modifiable address portion of the input address.

7. The system as in claim 3 wherein the non-modifiable address portion of the input address comprises at least one address bit which is used as control information.

8. The system as in claim 7 wherein said control circuitry comprising:
   bypass circuitry for receiving the control information and for receiving the modifiable address portion, said bypass circuitry selectively bypassing permutation based on the control information and providing the modifiable address portion to said memory array if a bypass option is selected by the control information.

9. The system as in claim 1 further comprising:
   a second address permutation control register.

10. The system as in claim 9 wherein the input address comprises a non-modifiable address portion, and wherein the non-modifiable address portion comprises at least one address bit which is used as control information to select which one of said first and second address permutation control registers is used to provide the plurality of bit fields to said control circuitry to direct permutation of the input address.

11. The system as in claim 9 wherein the system is formed on a single integrated circuit.

12. The system as in claim 1 further comprising:
   at least one processing unit, coupled to said control circuitry for providing the input address to said control circuitry.

13. The system as in claim 1 wherein a value of a first bit of the permutated address is a function of a first bit field of said address permutation control register.

14. The system as in claim 1 wherein a value of a first bit of the permutated address is a function of a first bit field of said address permutation control register and a value of a first bit of the input address.

15. A system having memory addressing, comprising:
   control circuitry for receiving an input address having a modifiable portion;

an address permutation control register having a plurality of bit fields, said address permutation control register having a first bit field for directing permutation of a first portion of the modifiable portion of the input address and a second bit field which is used by said control circuitry to direct permutation of a second portion of the input address, the control circuitry receiving the plurality of bit fields from said address permutation control register, said control circuitry permutating a predetermined differing portion of the input address under direction of each respective one of the plurality of bit fields to generate a permutated address; and a memory array for receiving the permutated address from said control circuitry and for using the permutated address to access said memory array.

16. The system as in claim 15 wherein the first bit field and the second bit field are concurrently used by said control circuitry to direct permutating of the input address.

17. The system as in claim 15 wherein the first portion of the input address is a first bit of the input address and the second portion of the input address is a second bit of the input address.

18. A method for providing memory addressing, the method comprising:

receiving an address having a modifiable portion;

providing a first address permutation control register and a second address permutation control register, each having a plurality of bit fields that implement any of a plurality of user controlled addressing modes;

modifying the modifiable portion of the address under direction of the plurality of bit fields of one of the first address permutation control register or the second address permutation control register to generate a permutated address; and providing the permutated address for memory addressing.

19. A system for providing memory addressing, the system comprising:

means for receiving an input address having a modifiable portion;

user programmable means comprising a control register having at least two fields that respectively control permutation of differing sections of the modifiable portion of the input address;

means for modifying the modifiable portion of the input address under direction of the user programmable means; and means for providing the permutated address for memory addressing.

* * * * *